(12) United States Patent
Clubb et al.

(10) Patent No.: US 7,590,980 B1
(45) Date of Patent: Sep. 15, 2009

(54) SYSTEM AND METHOD FOR A FUNCTIONAL EXTENSIBILITY FRAMEWORK

(75) Inventors: Ian James Clubb, Cambridge (GB); Philip Geoffrey Claridge, Cambridge (GB); Thomas Joseph Shusta, Longwood, FL (US); Jeffrey M. Miller, Oviedo, FL (US); Robert Walters, Lake Mary, FL (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 676 days.

(21) Appl. No.: 11/151,930

(22) Filed: Jun. 14, 2005

Related U.S. Application Data

(60) Provisional application No. 60/579,402, filed on Jun. 14, 2004.

(51) Int. Cl.
G06F 9/44 (2006.01)
G06F 9/46 (2006.01)
G06F 13/00 (2006.01)

(52) U.S. Cl. ........................ 717/163; 717/114; 717/167; 719/330; 719/331

(58) Field of Classification Search .................. 717/163
See application file for complete search history.

(56) References Cited

U.S. PATENT DOCUMENTS

| | | |
|---|---|---|
| 4,901,223 A | 2/1990 | Rhyne |
| 5,062,040 A | 10/1991 | Bishop et al. |
| 5,392,390 A | 2/1995 | Crozier |
| 5,539,883 A | 7/1996 | Allon |
| 5,544,086 A | 8/1996 | Davis et al. |
| 5,621,796 A | 4/1997 | Davis et al. |
| 5,649,164 A | 7/1997 | Childs et al. |
| 5,751,961 A | 5/1998 | Smyk |
| 5,758,351 A | 5/1998 | Gibson et al. |
| 5,801,938 A | 9/1998 | Kalantery |
| 5,838,909 A | 11/1998 | Roy et al. |
| 5,850,446 A | 12/1998 | Berger et al. |
| 5,860,137 A | 1/1999 | Raz et al. |
| 5,864,862 A | 1/1999 | Kriens et al. |
| 5,889,863 A | 3/1999 | Weber |
| 5,938,722 A | 8/1999 | Johnson |
| 5,978,840 A | 11/1999 | Nguyen et al. |
| 5,983,208 A | 11/1999 | Haller |
| 5,987,132 A | 11/1999 | Rowney |

(Continued)

FOREIGN PATENT DOCUMENTS

WO    WO 97/49052    12/1997

(Continued)

OTHER PUBLICATIONS

Yu-Chi Chang, Chih-Ping Chu and Weng-Long Chang, *A Pipe-Embedded-Component Assembly Mechanism in CORBA Environment*, 283-288 IEEE 2000.

(Continued)

*Primary Examiner*—James Rutten
(74) *Attorney, Agent, or Firm*—William S. Morriss; Frost Brown Todd LLC

(57) ABSTRACT

There is disclosed a framework which utilizes contemporaneous assembly of processing modules, strong typing, and integrated caching to assemble processing elements from different sources robustly and minimize system failures as software modules are upgraded.

15 Claims, 12 Drawing Sheets

| Data Extension | Data Extension Input / Output Name | Input / Output Number | Basic Data Type | Attribute Type |
|---|---|---|---|---|
| Cell site lookup | Name of the cellular radio cell site | Input (#1) | String | 'CellName' |
| | Location | Output (#1) | Array [2] of numeric | 'LatLong' |
| Distance measurement | Location 1 | Input (#1) | Array [2] of numeric | 'LatLong' |
| | Location 2 | Input (#2) | Array [2] of numeric | 'LatLong' |
| | Distance between locations. | Output (#1) | Numeric | 'DistanceMiles' |
| Distance zoning | Distance between locations. | Input (#1) | Numeric | 'DistanceMiles' |
| | Return a zone code to allow for pricing. E.g. zone 1 is within 10 miles, zone 2 is 10 to 50 miles, …. | Output (#1) | Numeric | 'PricingZone' |

U.S. PATENT DOCUMENTS

| | | | |
|---|---|---|---|
| 6,035,342 | A | 3/2000 | Bernstein et al. |
| 6,041,332 | A | 3/2000 | Miller et al. |
| 6,044,216 | A * | 3/2000 | Bhargava et al. ............ 717/114 |
| 6,058,423 | A | 5/2000 | Factor |
| 6,072,870 | A | 6/2000 | Nguyen et al. |
| 6,088,659 | A | 7/2000 | Kelley et al. |
| 6,119,105 | A | 9/2000 | Williams et al. |
| 6,167,378 | A | 12/2000 | Webber, Jr. |
| 6,175,876 | B1 | 1/2001 | Branson et al. |
| 6,199,068 | B1 | 3/2001 | Carpenter |
| 6,230,309 | B1 | 5/2001 | Turner et al. |
| 6,233,565 | B1 | 5/2001 | Lewis et al. |
| 6,253,027 | B1 | 6/2001 | Weber et al. |
| 6,253,230 | B1 | 6/2001 | Couland et al. |
| 6,272,523 | B1 | 8/2001 | Factor |
| 6,282,276 | B1 | 8/2001 | Felger |
| 6,311,165 | B1 | 10/2001 | Coutts et al. |
| 6,324,525 | B1 | 11/2001 | Kramer et al. |
| 6,363,363 | B1 | 3/2002 | Haller et al. |
| 6,373,950 | B1 | 4/2002 | Rowney |
| 6,374,297 | B1 | 4/2002 | Wolf et al. |
| 6,396,913 | B1 | 5/2002 | Perkins |
| 6,578,068 | B1 | 6/2003 | Bowman-Amuah |
| 6,594,692 | B1 | 7/2003 | Reisman |
| 6,601,761 | B1 | 8/2003 | Katis |
| 6,658,099 | B2 | 12/2003 | Perkins |
| 6,658,568 | B1 | 12/2003 | Ginter et al. |
| 6,675,153 | B1 | 1/2004 | Cook et al. |
| 6,813,770 | B1 * | 11/2004 | Allavarpu et al. ........... 719/316 |
| 2001/0018648 | A1 | 8/2001 | Turner et al. |
| 2001/0034725 | A1 | 10/2001 | Park et al. |
| 2001/0039537 | A1 | 11/2001 | Carpenter et al. |
| 2002/0013767 | A1 | 1/2002 | Katz |
| 2002/0077978 | A1 | 6/2002 | O'Leary et al. |
| 2002/0103753 | A1 | 8/2002 | Schimmel |
| 2002/0152106 | A1 | 10/2002 | Stoxen et al. |
| 2002/0156683 | A1 | 10/2002 | Stoutenburg et al. |
| 2002/0169719 | A1 | 11/2002 | Dively et al. |
| 2002/0194502 | A1 | 12/2002 | Sheth et al. |
| 2003/0046094 | A1 | 3/2003 | Singh et al. |
| 2003/0115353 | A1 | 6/2003 | Deryugin et al. |
| 2003/0120546 | A1 | 6/2003 | Cusack et al. |
| 2003/0140004 | A1 | 7/2003 | O'Leary et al. |
| 2003/0145205 | A1 | 7/2003 | Sarcanin |
| 2003/0149662 | A1 | 8/2003 | Shore |
| 2003/0163431 | A1 | 8/2003 | Ginter et al. |
| 2003/0177088 | A1 | 9/2003 | Nilsson et al. |
| 2003/0195846 | A1 | 10/2003 | Felger |
| 2003/0195847 | A1 | 10/2003 | Felger |
| 2003/0195848 | A1 | 10/2003 | Felger |
| 2003/0212834 | A1 | 11/2003 | Potter et al. |
| 2003/0212927 | A1 | 11/2003 | Navar et al. |
| 2004/0019900 | A1 | 1/2004 | Knightbridge et al. |
| 2004/0128199 | A1 | 7/2004 | Cusack et al. |
| 2004/0133622 | A1 | 7/2004 | Clubb et al. |
| 2004/0172464 | A1 | 9/2004 | Nag |
| 2004/0194087 | A1 | 9/2004 | Brock et al. |

FOREIGN PATENT DOCUMENTS

| | | |
|---|---|---|
| WO | WO 97/49055 | 12/1997 |
| WO | WO 98/05011 A2 | 2/1998 |
| WO | WO 98/10381 A1 | 3/1998 |
| WO | WO 98/13797 A2 | 4/1998 |
| WO | WO 99/13426 | 3/1999 |
| WO | WO 00/00915 A1 | 1/2000 |
| WO | WO 01/01300 A1 | 1/2001 |
| WO | WO 01/01313 A2 | 1/2001 |
| WO | WO 01/086570 A1 | 11/2001 |
| WO | WO 02/059754 A1 | 8/2002 |
| WO | WO 02/082305 A2 | 10/2002 |
| WO | WO 02/096012 A1 | 11/2002 |
| WO | WO 02/096105 A1 | 11/2002 |
| WO | WO 2004/034228 A2 | 4/2004 |

OTHER PUBLICATIONS

Office Action Non-Final Response for U.S. Appl. No. 10/682,663 (Dec. 13, 2007).
Office Action dated Dec. 31, 2007 for U.S. Appl. No. 10/666,631.
Office Action dated Oct. 30, 2008 for U.S. Appl. No. 11/197,597.
Office Action dated Mar. 24, 2009 for U.S. Appl. No. 11/197,597.
Office Action dated Apr. 14, 2009 for U.S. Appl. No. 10/666,631.
U.S. Appl. No. 60/417,706, filed Oct. 10, 2002, Clubb et al., Convergys Cross Ref.
U.S. Appl. No. 60/598,951, Convergys Cross Ref.
U.S. Appl. No. 60/579,402, Convergys Cross Ref.
U.S. Appl. No. 10/666,631, Convergys Cross Ref.
U.S. Appl. No. 10/190,844, Convergys Cross Ref.
U.S. Appl. No. 09/709,942, Convergys Cross Ref.
U.S Appl. No. 10/682,601, filed Oct. 9, 2003, Clubb et al., Hydra I.
U.S. Appl. No. 10/682,663, filed Oct. 9, 2003, Clubb et al., Hydra II.
U.S. Appl. No. 11/555,518, Clubb et al., Hydra III.
U.S. Appl. No. 11/197,597, filed Aug. 4, 2005, Clubb et al., Hydra IV.
U.S. Appl. No. 11/151,930, filed Jun. 14, 2005, Clubb et al., Hydra V.
*The ACE Programmer's Guide*—ISBN 0-201-69971-0 Source Unavailable.
*Berkeley DB* by New Riders Library of Congress Catalogue # 00-109051 Source Unavailable.
*Java Language Definition* Source Unavailable.
Adams, D. J., Programming Jabber: Extending XML Messaging (O'Reilly XML) Rejected messaging approach used for real time chat protocols. (Probably no reference needed) Source Unavailable.
Foster, Ian, The Grid: Blueprint for a New Computing Infrastructure: Classic text on distributed system applications Source Unavailable.
Plat, David S., Introducing Microsoft.NET, Reference document for .NET architecture Source Unavailable.
IBM Web services provisioning for Websphere; Web Services Hosting Technology Version 1.1, *White Paper: Overview and Introduction* Source Unavailable.
*Privacy-preserving inter-database operations* ISI 2004 : intelligence and security informatics: Tucson AZ, Jun. 10-11, 2004,Gang Liang; Chawathe Sudarshan S ; Chen Hsinchun ed; Moore Reagan ed; Zeng Daniel D ed; Leavitt John ed Computer Science Department, University of Maryland College Park, Maryland 20742 United States Conference: Symposium on intelligence and security informatics, 2, (Tucson AZ USA), Jun. 10, 2004 Lecture notes in computer science, 2004, vol. 3073, p. 66-82.
Houck, D.J.; Kim, E.; O'Reilly, G.P.; Picklesimer, D.D.; Uzunalioglu, H. *A Network Survivability Model For Critical National Infrastructures*, QoS Manage. & Assessment Group, Lucent Technol., Holmdel, NJ, USA Bell Labs Technical Journal, vol. 8, No. 4, p. 153-72 Publisher: Lucent Technologies, 2004.
*Convergys Corporation, Infinys: Geneva Rating and Billing, Administration and Maintenance*, Release 5.3. 2001-2004, (pp. 64-70) Convergys, Cincinnati, Ohio USA, pp. 64-70.
Ayad, N.; Verbraeck, A. Dept. of Syst. Eng., Delft Univ. of Technol., Netherlands Conference: 36th Hawaii International Conference on Systems Sciences, p. 10 pp. Publisher: IEEE Comput. Soc , Los Alamitos, CA, USA , 2003 , CD-ROM Pages Conference: 36th Hawaii International Conference on Systems Sciences, Jan. 6-9, 2003, Big Island, HI, USA *System Architecture For Cross Border Payment: A Case Study For The Financial Services Industry*.
Masaud-Wahaishi, A., et al., *Brokering Services in Cooperative Distributed Systems: Privacy Based Model*, EC-Web 2003, LNCS 2738, pp. 435-444.
Axis Beta I documentation, 2002 http://ws.apache.org/axis/java/index.html.
Graham, Steve, et al., *Building Web Services with Java: Making Sense of XML, SOAP, WSDL and UDDI*, Sams Indianapolis, Indiana, 2002 http://www.amazon.com/Building-Web-Services-Java-Developers/dp/0672326418.

Irani, Romin, S. Jeelani Basa, *Axis, Next Generation Java SOAP*, May 2002, Wrox Press, Birmingham, UK http://www.amazon.com/AXIS-Next-Generation-Java-SOAP/dp/1861007159 Publisher: Peer Information; 1st edition (May 2002) ISBN-10: 1861007159 ISBN-13: 978-1861007155.

Iyengar, et al., *Enhancing web performance*, Communication Systems. State of the Art. IFIP 17th World Computer Congress—TC6 Stream on Communication Systems: The State of the Art, 2002, pp. 95-126.

Wang, T, et al., *A Distributed Secure E-Commerce Model with a Non-Secure Merchant Server for Developing Nations*, IKE 2002 International Conference.

Sycara, K. Sch. of Comput. Sci., Carnegie Mellon Univ., Pittsburgh, PA, USA Conference: Proceedings of the First International Joint Conference on Autonomous Agents and Multiagent Systems , p. 1044. Publisher: ACM, New York, NY, USA , 2002 , CD-ROM Pages Conference: AAMAS '02: First International Joint Conference on Automomous Agents and Multi-Agent Systems, Jul. 15-19, 2002, Bologna, Italy, Agents Supporting Humans And Organizations In Open Dynamic Environments.

*Cygent Smart Component Server Concepts Guide*—Version 4.0, SCSC40, Jun. 5, 2002, General Release Source Unavailable.

*Siebel eBusiness Applications: Integration Business Process Summary Document, eCommunications*, eMedia, Version 7.5.2, UAN 1.1 CME, Document Version 2.0, Nov. 2002 Source Unavailable.

Hakomori, S.; Taniguchi, H. Dept. of Inf. Technol., NTT Data Corp., Tokyo, Japan Systems and Computers in Japan, vol. 33, No. 14, p. 59-71 Publisher: Scripta Technica, Dec. 2002 *An Operating System For An Online Transaction Processing System With A Heavy Load*.

Allamaraju, Subrahmanyam (Editor), et al., Professional Java Server Programming J2EE, 1.3 Edition, (Perfect Paperback—Sep. 2001): An example of one of the many Java J2EE texts. http://www.amazon.com/Professional-Java-Server-Programming-J2EE/dp/1861005377 Publisher: Wrox Press; 1st edition (Sep. 2001) ISBN-10: 1861005377 ISBN-13: 978-1861005373.

*Siebel eBusiness Application Integration* vol. I, eBusiness Applications, Version 7.0, 10PA1-0V00-07000, Sep. 2001 Source Unavailable.

*Siebel eCommunications Guide: eBusiness Applications Version 7.0 80PA1-CG00-70000*, Dec. 2001 Source Unavailable.

Chang, et al., *A pipe-embeded-component assembly mechanism in CORBA environment*, IEEE 2000, pp. 283-288.

Little, Hayward; Esterline, A. North Carolina Agricultural and Technical State Univ, Greensboro, NC, USA Conference: IEEE SoutheastCon 2000 'Preparing for the New Millennium', Nashville, TN, USA, 19000407-19000409 , (Sponsor: IEEE Region-3; Vanderbilt University; Tennessee State University; Tennessee Technological University; et al.) Conference Proceedings—IEEE Southeastcon 2000. IEEE, Piscataway, NJ, USA. p. 64-67, 2000 *Agent-Based Transaction Processing*.

Russell, Travis, Signalling System #7, reference for distributed architectures used in switched phone network. http://www.amazon.com/Signaling-System-7-Travis-Russell/dp/0071361197 Publisher: McGraw-Hill Companies; 3rd edition (Jun. 19, 2000) ISBN-10: 0071361197 ISBN-13: 978-0071361194.

Mori, M., et al., *Proposal of Application Architecture in Electronic Commerce Service Between Companies*, WECWIS International Workshop, 1999.

Paik, I., *Universal Electronic Commerce Framework and Distributed Object Services Based on SET Protocol*, IASTED Conference, Software Engineering, 1998.

*Signal and Image Processing* (SIP '98), Proceedings of the IASTED International Conference, Las Vegas, Nevada—USA Complete Source Unavailable.

Ishizaka T; Hyou K Bit Inc., Jpn ; Dalian Univ. Technol., Chn Joho Shori Gakkai Shinpojiumu Ronbunshu, 1998, vol. 98, No. 14, p. 147-151 *TimeCube-a Temporal Data Warehouse and Its Distributed Applications*.

TREC'98 : trends in distributed systems for electronic commerce : Hamburg, Jun. 3-5, 1998 Papazoglou M P; Jeusfeld M A; Weigand H; Jarke M ; Lamersdorf Winfried ed; Merz Michael ed Infolab, Tilburg University 5000 Le Tilburg Netherlands; RWTH Aachen, Informatik V 52056 Aachen Germany Conference: International IFIP/GI working conference, (Hamburg DEU), Jun. 3, 1998 Lecture notes in computer science, 1998, vol. 1402, p. 192-204 *Distributed, Interoperable Workflow Support For Electronic Commerce*.

Balasubramanian, R.; Haskell, L.; Karmarkar, V.; Lackey, J.; Yatchman, M. Lucent Technol., USA Conference: ISS'97: World Telecommunications Congress. 'Global Network Evolution: Convergence or Collision?'. Proceedings Part: vol. 2 , p. 105-112 vol. 2 Publisher: Pinnacle Group, Toronto, Ont., Canada, 1997,2 vol. (xxxiv+591+633) Pages Conference: Proceedings of ISS'97 International Switching Symposium, Sponsor: Alcatel Canada, Bell Canada, BC Tel, Island Telphone Co., Manitoba Telecom Serv., et al, Sep. 21-26, 1997, Toronto, Ont., Canada *Toward Object-Web-Based Service Provider Infrastructure For E-Commerce Transactions*.

Vogler, Hartmut; Kunkelmann, Thomas; Moschgath, Marie-Louise Darmstadt Univ of Technology, Darmstadt, Ger Conference: Proceedings of the 1997 International Conference on Parallel and Distributed Systems, Seoul, South Korea, 19971210-19971213 , (Sponsor: IEEE) Proceedings of the Internatoinal Conference on Parallel and Distributed Systems—ICPADS 1997. IEEE Comp Soc, Los Alamitos, CA, USA,97B100215. p. 268-274, 1997 *Approach For Mobile Agent Security And Fault Tolerance Using Distributed Transactions*.

Linn, C.; Howarth, B. Dept. Of Comput., Univ. of Western Sydney, Nepean, NSW, Australia, p. 203-212 Publisher: IEEE Comput. Soc. Press , Los Alamitos, CA, USA, 1994 , xii+272 Pages Conference: Proceedings of 3rd International Conference on Parallel and Distributed Information Systems, Sponsor: IEEE Comput. Soc. Tech. Committee on Data Eng., ACM SIGMOD, Bellcore, US West, Sep. 28-30, 1994 , Austin, TX, USA *A Proposed Globally Distributed Federated Database: A Practical Performance Evaluation*.

Lee, P.C.; Ghosh, S. Integration Services Div., Andersen Consulting, Kuala Lumpur, Malaysia IEEE Journal on Selected Areas in Communications , vol. 12, No. 6, p. 1072-1087, Aug. 1994 *NOVAHID: A Novel Architecture For Asynchronous, Hierarchical, International, Distributed, Real-Time Payments Processing*.

Lee, Tony; Ghosh, Sumit Brown Univ, Providence, RI, USA Simulation v 62 n 3 Mar. 1994. p. 180-201, 1994 *Distributed Approach To Real-Time Payments-Processing In A Partially-Connected Network Of Banks Modeling And Simulation*.

Lee, Y.-H.; Yu, P.S.; Iyer, B.R. IBM Thomas J. Watson Res. Center, Yorktown Heights, NY, USA IEEE Transactions on Computers, vol. C-36, No. 8 , p. 976-987 , Aug. 1987 *Progressive Transaction Recovery in Distributed DB/DC Systems*.

CIFS—Common Internet File System. Microsoft sponsored alternative to NFS. http://www.microsoft.com/mind/1196/cifs.asp.

Dell PowerEdge 1655MC server. Documentation/vendor products re: cluster in a chassis with the following features: node management, Hot swap, Integral Gigabit Ethernet networks, SAN or Network Attached Storage support, Integral storage modules.

VI: Virtual Interface: Fast memory to memory transfers over network. Virtual Interface Architecture Specification: ftp://download.intel.com/design/servers/vi/VI_Arch_Specification10.pdf.

WEBSITES.

IBM: http://www-03.ibm.com/systems/bladecenter/products/Documentation/vendor product re: cluster in a chassis with the following features: node management, Hot swap, Integral Gigabit Ethernet networks, SAN or Network Attached Storage support, Integral storage modules.

http://www-3.ibm.com/software/solutions/webservices/bpel.html.
http://www-106.ibm.com/developerworks/webservices/library/ws-wsht/ IBM Web services provisioning.
http://www.altiris.com/ Blade Server Support.
http://www.antssoftware.com/technology/ace.php3 Lock free databases: ANTS.
http://www.beowulf.org/overview/index.html Beowulf introduction.
http://www.beowulforg/overview/faq.html Beowulf Overview.
http://www.brocade.com/ Brocade.
http://www.cdt.luth.se/~olov/publications/JHSN-98.pdf Resource sharing in advance reservation agents, Olov Schelen and Stephen Pink, Computer Science and Electrical Engineering, Lulea University of Technology, Sweden.
http://www.clusterfs.com/ Cluster File System / InterMezzo.
http://clustering.foundries.sourceforge.net/ SourceForge.

http://www.cs.fsu.edu/~engelen/soap.html Microsoft sponsored standard submitted to IETF to wrapper message payloads of different types (e.g. XML, binary, JPEG), into a common message payload. The DIME standard makes it very simple to skip unwanted parts of the message (unlike the similar Mime function for E-mails). Integrating into a number of SOAP toolkits.
http://www.csm.ornl.gov/oscar/ Oscar: Open source clustering application resources: OSCAR Components.
http://www.csimornl.gov/pvm/ PVM.
http://www.csm.ornl.gov/torc/C3/ C3.
http://www.cs.oberlin.edu/~jbasney/honors/thesis.html Programming Language Linda.
http://www.cs.umanitoba.ca/~pgraham/papers/hpcs98.pdf Managing Long Linked Lists Using Lock Free Techniques, Mohammad Farook and Peter Graham, University of Manitoba, Canada.
http://www.cs.wustl.edu/~schmidt/ACE-overview.html Source code about the Shared Memory management portion of the ACE library Documentation of ACE C++ as a sample framework that supports dynamic loading.
http://www.cs.yale.edu/Linda/ap_and_piranha.html.
*Adaptive Parallelism and Piranha*, Nick Carriero, Eric Freeman, David Gelernter and David Kaminsky.
*Adaptive Parallelism and Piranha*. Yale University, Feb. 1994.
Abstract, full article requires IEEE subscription, abstracts from: http://ieeexplore.ieee.org/xpl/freeabs_all.jsp?tp=&arnumber=362631&isnumber=8308.
This paper appears in: Computer Publication Date: Jan. 1995, vol. 28, Issue: 1, pp. 40-49, ISSN: 0018-9162, References Cited: 12, CODEN: CPTRB4, INSPEC Accession No. 4881874, Digital Object Identifier: 10.1109/2.362631, Posted online: Aug. 6, 2002 20:02:51.0.
http://www.eecs.harvard.edu/dafs/ or http://www.acmqueue.org/modules.php?name=Content&pa=showpage&pid=48, DAFS-Direct Access File System.
http://www.dell.com/downloads/global/products/pedge/en/pe1955_spec_sheet.pdf Documentation/vendor products re: cluster in a chassis with the following features: node management, Hot swap, Integral Gigabit Ethernet networks, SAN or Network Attached Storage support, Integral storage modules.
http://www.dwheeler.com/program-library/Program-Library-HOWTO/shared-libraries.html.
http://freshmeat.net/browse/141/?topic_id=141 Links from Freshmeat.
http://www.globus.org/alliance/publications/papers/iwqos.pdf A Distributed Resource Management Architecture that Supports Advance Reservations and Co-Allocation, Ian Foster, Mathematics and Computer Science Division, Argonne National Laboratory and Department of Computer Science, University of Chicago.
http://www.gnutella.co.uk/library/pdf/paper_final_gnutella_english.pdf Gnutella: Distributed System for Information Storage and Searching, Model Description, Fernando R. A. Bordignon, Gabriel H. Tolosa, bordi@unlu.edu.ar, tolosoft@unlu.edu.ar, División Estadistica y Sistemas, Departamento de Ciencias Básicas, Universidad Nacional de Luján.
http://gridengine.sunsource.net/.
HP: http://h18004.www1.hp.com/products/blades/components/bladeservers.html Documentation/vendor products re: cluster in a chassis with the following features: node management, Hot swap, Integral Gigabit Ethernet networks, SAN or Network Attached Storage support, Integral storage modules.
http://www.ibiblio.org/pub/Linux/docs/HOWTO/other-formats/html_single/Beowulf-HOWTO.html Beowulf Clusters.
http://www.icewalkers.com/Linux/Software/513710/LUI.html LUI—Linux Utility for cluster Install. The Linux Utility for cluster Install (LUI) utility—an open-source project sponsored by IBM that was released in Apr. 2000 under the GPL (GNU Public License).
http://www.ietf. org/html.charters/rserpool-charter.html The RSerPool standards.
http://www.iis.ee.ic.ac.uk/~frank/surp98/report/sha/ SET / Secure Electronic Transaction Protocol.
http://www.infinibandta.org/home Infiniband: Next generation storage interconnect based on multiple of 2.5Gbit links.
http://www.intel.com/ Technologies to support commercial clustering Specifically the Intel® Cluster Toolkit for Linux. And Intel MPI Library. Currently: http://www.intel.com/cd/software/products/asmo-na/eng/244171.htm.
http://www.inter-mezzo.org/ InterMezzo: High availability distributed file system.
http://www.isotton.com/howtos/C++dlopen-mini-HOWTO/C++-dlopen-mini-HOWTO.html Dynamic loading of C++ classes. Source Unavailable.
www.ietf.org Linux kernel LKSCTP under test with Kernel 2.5.29.
http://java.sun.com/j2ee/download.html#platformspec J2EE 1.4 Enterprise Edition Specification Proposed Final draft, Aug. 19, 2002.
http://java.sun.com/webservices/docs.html JSR-101, Java API for SML base RPC 1.0, JAX-RPC?.
http://jcp.org/aboutJava/communityprocess/first/jsr109/index.html JSR-109, Web Services for J2EE, Versio 1.0 proposed final draft: Aug. 19, 2002.
http://www.lam-mpi.org/ LAM/MPI.
http://www.linux-mag.com/2002-04/compile_01.html *Building and Using Shared Libraries*, Requires subscription to access. Source Unavailable.
http://www.lua.org/ddj.html Doctor Dobb's Journal Lua Example.
http://www.lua.org/docs.html Lua Home Page.
http://msdn.microsoft.com/msdnmag/issues/02/12/DIME/ Microsoft sponsored standard submitted to IETF to wrapper message payloads of different types (e.g. XML, binary, JPEG), into a common message payload. The DIME standard makes it very simple to skip unwanted parts of the message (unlike the similar MIME function for E-mails). Integrating into a number of SOAP toolkits.
http://www.netlib.org/utk/papers/mpi-booldmpi-book.html MPI Textbook.
http://www.nfsv4.org/nfs4technifo.html Network File System Version 4, RFC standards relating to the NVS protocol (CS file persistence), printed Sep. 15, 2005.
http://www.openclustergroup.org/ Oscar: Open source clustering application resources: OSCAR Components.
http://www.opengroup.org/onlinepubs/007908799/xsh/dlopen.html for documentation of dlopen().
www.openldap.org LDAP—Review LDAP for external application access to Hydra directory services if required.
http://www.openp2p.com/pub/a/p2p/2004/04/16/matrix.html Open P2P website.
http://www.openpbs.org/ PBS.
http://www.openssh.com/ OpenSSH.
http://www.openssl.org/ OpenSSL.
http://parlweb.parl.clemson.edu/pvfs/ Parallel Virtual File System.
http://people.redhat.com/drepper/dsohowto.pdf Linus shared library tutorial.
www.qlogic.com iSCS1: Hardware accelerated virtual SCSI connections over 1G and 10G Ethernet.
http://www.quadrics.com/ supercomputer interconnect and resource management.
www.qualcomm.com/press/PDF/BREW_whitepaper.
pdf—Alternate location: http://whitepapers.zdnet.co.uk/0,1000000651,260064487p,00.htm—Requires signup to download. The Road to Profit is Paved with Data Revenue—QUALCOMM *Internet* Services White Paper—Jun. 2002 Source Unavailable.
http://www.racemi.com/ Racemi DynaCenter scheduled for release in Q3 2002 that is claimed will "reconfigure network switching and storage on the fly to dynamically allocate server resources for use as a shared utility, in real-time.".
www.saforum.org/ High availability specifications.
http://save.wellsfargostore.com/wallet/Security.asp?SID Wells Fargo Electronic Wallet Security Information Source Unavailable.
http://www.scali.com/ Scali.
www.sctp.de Linux kernel LKSCTP under test with Kernel 2.5.29 RSerPool assumes a new standard messaging protocol called SCTP.
www.sctp.org Linux kernel LKSCTP under test with Kernel 2.5.29 RSerPool assumes a new standard messaging protocol called SCTP.
http://heather.cs.ucdavis.edu/~matloff/Linda/NotesLinda.NM.html Linda Tutorial.
http://www.sistina.com/products_gfs.htm Sistina Software (volume management, and global file system).

http://www.sisuite.org/ System Installation Suite.
http://www.sleepycat.com/docs/ref/toc.html Product documentation about Berkeley DB.
http://www.perfectxml.com/Xanalysis/TSG/TSG_DefiningWebServices.pdf The Stencil Group: Defining Web Services.
http://wwws.sun.com/software/gridware/ Sun's Grid Engine software products designed to support both cluster and campus wide computing.
http://supercluster.org/maui/ Maui PBS Scheduler.
http://www.textuality.com/bonnie/ Bonnie: File system benchmark.
http://www.theinquirer.net/?article=4438 Platform futures: Intel Tiger Xeon 1.6GB.
http://www.mpi-forum.org/ MPI message passing interface.
http://www-unix.mcs.anl.gov/mpi/mpich/ MPICH.
http://www.w3.org/TR/SOAP SOAP 1.1, May 2000.
http://www.w3.org/TR/2002/WD-soap12-part1-20020626 W3C SOAP Version 1.2 Part 1: Message Framework, Working Draft.
http://www.w3.org/2001/03/WSWS-popa/paper51 IBM and Microsoft, Web Services Framework for W3C Workshop on Web Services, Apr. 11-12, 2001, San Jose CA.
http://www.xml.com/pub/r/1173 HTTPR—A reliable messaging standard intended for SOAP based in HTTP.
Information Disclosure Statement for U.S. Appl. No. 10/682,601 dated Oct. 27, 2004.
Office Action dated Dec. 11, 2006 for U.S. Appl. No. 10/682,601.
Office Action dated Apr. 12, 2007 for U.S. Appl. No. 10/682,601.
Information Disclosure Statement for U.S. Appl. No. 11/197,597, filed Aug. 4, 2005.
Information Disclosure Statement for U.S. Appl. No. 11/197,597, filed Sep. 28, 2005.
Information Disclosure Statement for U.S. Appl. No. 11/151,930, filed Nov. 28, 2005.
Information Disclosure Statement for U.S. Appl. No. 10/190,844, filed Jul. 8, 2002.
Office Action dated Dec. 7, 2005 for U.S. Appl. No. 10/190,844.
Information Disclosure Statement for U.S. Appl. No. 10/190,844, filed Mar. 23, 2006.
Office Action dated May 24, 2006 for U.S. Appl. No. 10/190,844.
Information Disclosure Statement for U.S. Appl. No. 09/425,548, filed Oct. 10, 2000.
Office Action dated Nov. 30, 2000 for U.S. Appl. No. 09/425,548, filed Nov. 30, 2000.
Office Action dated Nov. 30, 2000 for U.S. Appl. No. 09/425,548, filed Jun. 11, 2001.
Notice of References Cited for U.S. Appl. No. 09/425,548.
Information Disclosure Statement for U.S. Appl. No. 09/961,673 dated Sep. 24, 2001.
Office Action dated Mar. 20, 2002 for U.S. Appl. No. 09/961,673.
Office Action dated Nov. 14, 2002 for U.S. Appl. No. 09/961,673.
Information Disclosure Statement for U.S. Appl. No. 10/666,631.
Information Disclosure Statement for U.S. Appl. No. 09/709,942 dated Sep. 9, 2001 (abandoned).
Notice of References Cited for U.S. Appl. No. 09/709,942 (abandoned).
Office Action undated for U.S. Appl. No. 09/709,942 (abandoned).
Office Action dated Dec. 22, 2003 for U.S. Appl. No. 09/709,942 (abandoned).
Office Action dated Jun. 21, 2004 for U.S. Appl. No. 09/709,942 (abandoned).
Office Action dated Dec. 6, 2004 for U.S. Appl. No. 09/709,942 (abandoned).
Office Action dated Oct. 3, 2005 for U.S. Appl. No. 10/190,728, filed Jul. 8, 2002.
Final Rejection dated Apr. 23, 2008 for U.S Appl. No. 10/682,663.
Non-Final Rejection dated Aug. 8, 2008 for U.S. Appl. No. 10/682,601.
Office Action dated Jun. 3, 2009 for U.S. Appl. No. 10/682,601.

* cited by examiner

FIG. 1

| Data Extension | Data Extension Input / Output Name | Input / Output Number | Basic Data Type | Attribute Type |
|---|---|---|---|---|
| Cell site lookup | Name of the cellular radio cell site | Input (#1) | String | 'CellName' |
| | Location | Output (#1) | Array [2] of numeric | 'LatLong' |
| Distance measurement | Location 1 | Input (#1) | Array [2] of numeric | 'LatLong' |
| | Location 2 | Input (#2) | Array [2] of numeric | 'LatLong' |
| | Distance between locations. | Output (#1) | Numeric | 'DistanceMiles' |
| Distance zoning | Distance between locations. | Input (#1) | Numeric | 'DistanceMiles' |
| | Return a zone code to allow for pricing. E.g. zone 1 is within 10 miles, zone 2 is 10 to 50 miles, …. | Output (#1) | Numeric | 'PricingZone' |

FIG. 4

| Enhancement | Input / Output | Attribute | Uses DE |
|---|---|---|---|
| Calling Site Lookup | Input (#1) | Calling Cell Site Name | Cell Site Lookup |
| | Output (#1) | Calling Cell Location | |
| Called Site Lookup | Input (#1) | Called Cell Site Name | Cell Site Lookup |
| | Output (#1) | Called Cell Location | |
| Inter-cell Distance Calculation | Input (#1) | Calling Cell Location | Distance measurement |
| | Input (#2) | Called Cell Location | |
| | Output (#1) | Call Distance | |
| Cell Zoning | Input (#1) | Call Distance | Distance zoning |
| | Output (#1) | Prize Zone | |

FIG. 5

| Enhancement | Input / Output | Attribute | Uses DE |
|---|---|---|---|
| Inter-cell Distance Calculation From January 2004 | Input (#1) | Calling Cell Location | Distance zoning V2 |
| | Input (#2) | Called Cell Location | |
| | Output (#1) | Call Distance | |

FIG. 6

| Attribute Set | Attribute | Attribute Source | (Source) Enhancement |
|---|---|---|---|
| Zone Based Pricing | Calling Cell Site Name | Input | N/A |
| | Calling Cell Location | DE derived | Calling Site Lookup |
| | Called Cell Site Name | Input | N/A |
| | Called Cell Location | DE derived | Called Cell Site Lookup |
| | Call Distance | DE derived | Inter-cell Distance Calculation |
| | Price Zone | DE derived | Distance Zoning |

FIG. 8

| Attribute Set | Attribute | Attribute Source | Date Range | (Source) Enhancement |
|---|---|---|---|---|
| Zone Based Pricing | Calling Cell Site Name | Input | Forever | N/A |
| | Calling Cell Location | DE derived | Forever | Calling Site Lookup |
| | Called Cell Site Name | Input | Forever | |
| | Called Cell Location | DE derived | Forever | Called Cell Site Lookup |
| | Call Distance | DE derived | Until 31-Dec-2003 | Inter-cell Distance Calculation |
| | Call Distance | DE derived | From 1-Jan-2004 | Inter-cell Distance Calculation From January 2004 |
| | Price Zone | DE derived | Forever | Distance Zoning |

FIG. 11

| Data Type category | Data loaded on only those machines which processing the applicable partitions | Data is loaded on all processing machines | Support for continuous replication of changes into the memory caches | Support for replication of a set of changes at a single point-in-time. |
|---|---|---|---|---|
| Partitionable | ✓ | | ✓ | |
| Global | | ✓ | ✓ | |
| Reference | | ✓ | | ✓ |

SYSTEM AND METHOD FOR A FUNCTIONAL EXTENSIBILITY FRAMEWORK

CROSS-REFERENCE TO RELATED APPLICATION

This non-provisional patent application claims priority from and is based on U.S. Provisional Application No. 60/579,402, Clubb et al., filed Jun. 14, 2004, incorporated herein in its entirety.

BACKGROUND OF THE INVENTION

Run-time loading of compiled code into a running program is supported within the Unix operating system (via the DLOPEN command) and within the Windows operating system (via dynamic linked libraries (DLLs)).

In general, a dynamic library interface allows a calling program to load and call function 'Y' from a library file 'X'. The library file is opened either automatically by the program or via explicit library calls. Plug-ins use fixed data structures (for parameters) and database schema changes (to introduce new sets of data to be processed rather than simply populating data in schema) to support these calls. But plug-ins have no "data type" safety at either compile or run time on the data interchanged. Therefore, data can be freely misinterpreted. Some shared library implementations may support type checking by compiling stubs (a stub is a small program routine that substitutes for a longer program, possibly to be loaded later or that is located remotely) with the linked module. Here, however, the calling code needs to be recompiled to use a new function interface. This sometimes results in "bringing down" servers in a production environment for an indeterminate length of time.

Most interpreted script environments can support run-time loading of script code. Hybrid environments are also available where a script engine can load script code to interpret and execute, and also load compiled code registered as functions that can be invoked explicitly from the script language (e.g., the LUA script engine described at http://wwwluaorg).

In a conventional system, few safeguards can be provided to ensure that only code modules with the same application inputs and outputs can be assembled together. Such checking cannot, normally, be undertaken at run-time as new code modules and new application types are defined. Known partial solutions, such as JAVA, include the use of a strongly-typed object-oriented language with compile time checking. However, these solutions do not operate with a) simple procedural code development tools based on simple types; b) environments with different plug-in language, or c) new type definition, validation and invocation at runtime.

Finally, plug-ins also do not provide any integrated caching support.

SUMMARY OF THE INVENTION

When an event is presented to a system, embodiments of the invention (collectively, hereinafter, referred to as FEF for embodiments of a Functional Extensibility Framework) may be used to enhance processing for that event.

A data type in a programming language is a set of data with values having predefined characteristics. Examples of data types are: integer, floating point unit number, character, string, and pointer. Usually, a limited number of such data types come built into a language. The language usually specifies the range of values for a given data type, how the values are processed by the computer, and how they are stored. A data type is a programming language concept that is used to put a meaning on data that is stored in memory of a computer. Programming systems also allow programmers to extend simple types by defining user-defined types based on the fundamental types defined in the programming language.

With object-oriented programming, a programmer can create new data types to meet application needs. Such an exercise is known as "data abstraction" and the result is a new class of data. Such a class can draw upon the "built-in" data types such as integers and characters. For example, a class could be created that would abstract the characteristics of a purchase order. The "purchase order" data type would contain the more basic data types of integers and characters and could also include other objects defined by another class. The "purchase order" data type would have all of the inherent services that a programming language provided to its built-in data types.

Languages that leave little room for programmers to define their own data types are said to be strongly-typed languages. A strongly-typed programming language is one in which each type of data (such as integer, character, hexadecimal, packed decimal, and so forth) is predefined as part of the programming language and all constants or variables defined for a given program must be described with one of the data types. Certain operations may be allowable only with certain data types. The language compiler enforces data typing and use compliance. An advantage of strong data typing is that it imposes a rigorous set of rules on a programmer and thus guarantees a certain consistency of results. A disadvantage is that it prevents the programmer from inventing a data type not anticipated by the developers of the programming language and it limits how "creative" one can be in using a given data type.

A "basic data type" or "weak data type" may be a simple type such as string or integer. An attribute type may be a strong (specific, non-simple) type such as 'DistanceMiles' or 'Cellular Base Station Location'. An attribute may comprise a specific instance of an attribute type (i.e., 'Calling Base Station Location' or 'Called Base Station Location'). Data Extensions (DEA) comprise weakly-typed code modules imported/registered into the FEF, which have been associated with (strong) attribute types. A Data Extension Library may comprise a number of data extensions in one file or library. A Data Extension Language may be the run-time language or script environment required to run a particular data extension. Data Enhancements (enhanced code modules) comprise specific instances of a DEX with associated Attributes. An Attribute Set comprises a set of Attributes, together with references to the Data Enhancements used to determine those Attributes not provided as inputs.

Multiple processing functions may be registered in any form of computer-readable storage/memory including, but not limited to, a database or a cache, to form the appendages of the FEF. In a preferred embodiment, a database or other form of non-transient memory may be used to store the processing functions. These may be assembled into a processing (dependency) chain at run-time. The processing chain is not predetermined. Rather, an implicit execution chain based on defined input/output data dependencies may be created. Alternatively, the framework may call the functions, in turn, without using a chain, in response to requests for values of strong attribute types. Such requests may be received from the program originating the request or from the processing modules themselves.

The processing modules may be written in different compiled languages or use one or more interpreted script languages. The parameter passing and invocation of the different processing modules for different tasks may be orchestrated through run-time data structures. The complete system may be date aware so that different connections between functions can be invoked dependent on the dates associated with the data being processed.

The modules loaded into the FEF may be written by third parties. Customers may be given access to the FEF framework to build and register their own code modules using a developer kit or graphical user interface (GUI).

The Functional Extensibility Framework may include one or more of the following features:

A) Strong typing: Processing modules can be written using a number of different compiler or interpreter technologies with simple types (e.g., integer and string), but may be configured and assembled at run-time through strong typing. Configuration error and enhanced system configuration productivity may be ensured by providing user interfaces that display only those modules which have matching data types for a given context.

B) Set based processing: Processing models may be automatically assembled and invoked based on the required data values, rather than by providing explicit procedural instructions.

C) Integrated caching support: The FEF has an integrated caching model to allow data required by the processing modules to be effectively extracted, cached, and partitioned. This feature enables the processing modules used with the FEF to have high performance access to any data required by the processing module, via a generic cache infrastructure which keeps the data resident in memory. The model may also integrate output value caching and lazy evaluation to ensure that processing modules are only called once, and only if their output values are required to be used.

Lazy evaluation may delay the call to a function until it is known to be needed. Suppose, for example, one has three DEX: A, B, and C. If A and/or B are required to generate the output of extension C, then A and/or B will always be called if the output C is required. However if the output C is never used, then none of A, B, and/or C may be called. A and/or B might be called if another extension used the output of A and/or B or the values of A and B were used directly. Caching minimizes the number of times that A and/or B may be evaluated. If extensions C and/or D both use A and/or B, then A and/or B may be evaluated and the output values may be cached for the use of the second extension. In another scenario, the system may support the following: C needs output of B, B needs output of A. Output of B would be considered optional because if C is not called, then B will not be needed. Likewise, if B is not needed then A will not be needed.

The environment of the plug-in may be unaware of the application in which the code could be used. Such plug-in code modules may have little or no library code to build, and the plug-in should be able to be moved between very different systems. For example, a generic table look-up component could be deployed in one system to look up cellular base stations, and, in another system, to book prices—all that would be changed is the registration of the code and the reference data that is used.

Other features of the FEF include the ability for many Data Enhancements to use a single DEX and many Attributes to use a single Attribute Type.

When an event is presented to a system, embodiments of the invention (collectively, hereinafter, referred to as FEF for embodiments of a Functional Extensibility Framework) may be used to populate an Attribute Set for that event. The FEF accepts inputs associated with that event and returns both input and derived attributes which may be used by the system to process the event. For each transaction, input and derived attributes may be grouped into an Attribute Set. Derived attributes may be determined using Data Enhancements. Data Enhancements are specific versions of the more general Data Extension. Using Data Extensions allows strong typing and attribute definitions to be held in a database.

This framework enables the robust assembly of processing elements from different sources. It further minimizes system failures as software modules are upgraded. A software framework is a partially complete, or semi-finished software (sub-)system that is intended to be instantiated. It defines the architecture for a family of (sub-)systems and provides the basic building blocks to create them. It also defines the places where adaptations for specific functionality may be made. In an object-oriented environment, a framework comprises abstract and concrete classes. Instantiation of such a framework comprises composing and sub-classing the existing classes. In short, a software framework is a set of cooperating classes that make up a reusable design for a specific class of software. User-defined classes (for example, new subclasses), receive messages from the predefined framework classes. These are usually handled by implementing superclass abstract methods.

A software framework can be geared toward building graphical editors for different domains like artistic drawing, music composition, and mechanical CAD.

Another software framework can help build compilers for different programming languages and target machines. Yet another might help build financial modeling applications or decision support systems.

An embodiment may comprise a framework for assembling processing modules to return and/or derive data in response to a request for such data from an external program. The term, external program, may refer to the application from which the request originates. There may also exist additional programs between the originating program and the FEF supplemented, possibly, by a variety of application programming interfaces for feeding the request to the FEF. These intermediate programs may also be external to the FEF, linked to the FEF, or may be bound to the FEF as a single program. Such an external program may comprise one or more libraries of registered code modules. The code modules may be registered in a database associated with the framework and be further defined (redefined) with a set of strongly-typed inputs and outputs. An external program may process an event by interacting with the framework to determine if any data needed to process the event is present in a cache or derivable through a dependency chain (path) of specialized processing modules that are linked together based on the specific strongly-typed inputs and outputs exposed by the specialized processing modules.

In another embodiment, there may be a computerized method for assembling code modules. A computerized method includes any method which employs a computer to accept and manipulate input based on a program or sequence of instructions. The method includes pre-registering at least one weakly-typed code module, wherein the weakly-typed code module comprises one or more weakly-typed variables, in a database; and pre-creating an enhanced code module by pre-associating at least one of the weakly-typed variables with at least one strong attribute type. Pre-registering refers to storing, at least, a pointer (a variable that contains the address of a location in computer-readable memory) to a code module. A code module may comprise a portable unit of software that may function as a component in a variety of systems. Weak types generally comprise simple data types. Strong types generally comprise more specific data types and may be user-defined. A data type in a programming language is a set of data with values having predefined characteristics.

The method may then include accepting a request for a value for a variable of said strong attribute type from an external program at runtime (runtime generally refers to when a program is running or being executed); accessing a database comprising a list of said strong attribute types and their associated enhanced code modules (a database is a computer-readable collection of information that is organized so that it can easily be accessed, managed, and updated); determining which enhanced code module is associated with the strong attribute type associated with the requested variable; executing the enhanced code module to determine the value for the variable; and returning the value, of the strong attribute type, to the external program.

In another embodiment, there may be a computerized method for assembling code modules comprising pre-registering at least one weakly-typed code module, herein said weakly-typed code module comprises one or more weakly-typed variables, in a computer-readable storage and pre-creating an enhanced code module by pre-associating at least one of said weakly-typed variables with at least one strong attribute type. The method may then include accepting a request for a value for a variable of said strong attribute type from an external program at runtime; accessing a computer-readable storage comprising a list of said strong attribute types and their associated enhanced code modules; determining which enhanced code module is associated with said requested strong attribute type; executing said enhanced code module to determine said value for said variable of said strong attribute type and, if said enhanced code module requires a value for an additional variable of a strong attribute type: (a) accessing a computer-readable storage comprising a list of said strong attribute types and their associated enhanced code modules; (b) determining which additional enhanced code module is associated with said requested strong attribute type; (c) executing said additional enhanced code module to determine said value for said additional variable of said strong attribute type and, if said additional enhanced code module requires a value for an additional variable of a strong attribute type, repeating steps (a)-(c). Finally, the sub-routine may include returning said value for said additional variable to said enhanced code module. Once all of the sub-routines have been executed, the method may include returning said value to said external program. This illustrates the potential for the FEF to call a series of nested processing modules without constructing a dependency chain beforehand. The FEF reacts to the need of processing modules to utilize values for variables characterized by strong types. One processing module may utilize additional strongly-typed variables that need to be calculated before it can be finally executed.

In another embodiment, one weakly-typed code module may be used as the base to create any number of enhanced code modules using the previously described method.

In another embodiment, the step of creating the enhanced code module may include assigning a value to a variable (setting a record) representing a particular execution environment/operating system environment (this may also be referred to as the platform and generally comprises the combination of hardware and software in a computer, i.e., an operating system, the computer system's coordinating program, which is built on the instruction set for a processor or microprocessor) for the enhanced code module.

In another embodiment, the pre-creating step may also or alternatively include setting a record in the enhanced code module indicative of a range of dates during which the enhanced code module may be executed. This allows the enhanced code modules to be date-sensitive. Date ranges may include, but are not limited to, time-of-day ranges and/or calendar date ranges.

In another embodiment, the invention comprises a method for assembling code modules comprising pre-registering a plurality of weakly-typed code modules, wherein the weakly-typed code modules comprise one or more weakly-typed variables, in a database, and pre-creating at least one enhanced code module by associating at least one of the weakly-typed variables with at least one strong attribute type. The method then comprises accepting a request for a value of said strong attribute type from an external program at runtime; accessing a database comprising a list of said strong attribute types and their associated enhanced code modules; determining a dependency path of said enhanced code modules to derive said requested value; executing the enhanced code modules in the dependency path to determine the value; and returning the value to the external program.

A dependency path (chain) comprises a group of two or more specialized processing modules (enhanced code modules) that are linked together based on the specific strongly-typed inputs and outputs exposed by the specialized processing modules. In this way, if a first code module requires a value for an input variable that is computed as output in a second code module, the two code modules may be linked in a dependency path to ensure that the first code module receives, as input, the output of the second code module. The second code module may be executed first and then feed its output into the first code module. Compatibility of the modules may be ensured by matching the strong types of the input and output variables used by each of the modules. A dependency chain is not limited to only two modules but may require further links (possibly nested) as needed. The dependency path may be constructed in advance and then executed or it may be contemporaneously assembled. For contemporaneous assembly, the FEF would run a specialized code module to attempt to derive a value for a strongly-typed variable. In the course of running the specialized code module, the FEF may determine that it needs to run additional code modules to obtain inputs that are necessary to derive requested value.

In another embodiment, the method may include storing the values calculated by an enhanced code module in a cache. Input values, intermediate values, and output values may all be stored in a cache. In a preferred embodiment, these values may be stored in transient computer-readable memory rather than the, preferably, less transient memory used to store the processing functions. It should be noted, however, that computer memory may be allocated in a variety of ways. While it is preferred to store functions in less transient computer-readable memory and to store values in a temporary cache (e.g., random access memory), any variation on these theme may be implemented. Thus, when a value is requested by an external program, the FEF may check the cache to see if an unexpired value for that variable is present in the cache. The cached values may be date-sensitive. If the value is not present in the cache, then the FEF may proceed to the other steps of deriving that value through the execution of a single enhanced code module or via a dependency path as described above. If the value is present in the cache, the FEF will simply return the value to the external program without executing the enhanced code module or constructing/executing a dependency path. The FEF may also check the cache in the course of executing a dependency path to determine if any intermediate values have been cached in previous runs of such enhanced code modules.

In another embodiment, a computerized method for assembling one or more code modules to calculate a rate associated with a phone call may comprise pre-programming a generic code module (a generic code module generally includes weakly-typed code modules but also or alternatively may include a code module designed to perform a simple function) configured to return a derived (calculated) value based on a difference between a first and second value; pre-registering the generic code module in a database; and pre-creating an enhanced code module to be associated with the generic code module by associating a strong attribute type with the derived value wherein the strong attribute type is of type zone (zone, here, generally refers to geographical divisions for rate plans but may be interpreted as any kind of division whether geographic, economic, population-based, etc.). Then the method may include the steps of accepting a request for the value of a variable of type zone from an external program; determining which enhanced code module returns a value for a variable of type zone; executing the enhanced code module; and returning the value to the external program. Please note that the specificity of this claim is not intended to limit variations involving other variables that might be used to zone a call or arrive at an actual rate.

In another embodiment, a computerized method for assembling code modules may comprise pre-registering a data extension module comprising one or more weakly-typed variables in a database and pre-creating a data enhancement module by associating at least one of said weakly-typed variables with a strong attribute type. It may further include accepting a request for a value for a variable of said strong attribute type from an external program at runtime; accessing a database comprising a list of said strong attribute types and their associated data enhancement modules; determining which data enhancement module is associated with said requested strong attribute type; executing said data enhancement module; and returning the value to the external program.

Embodiments other than a computerized method may be encompassed by the invention including software and systems.

In another embodiment, the invention comprises a system for assembling code modules which includes a database component, a first interface component, a second interface component, and a processing component. The database component operates to pre-store a pointer to at least one weakly-typed code module wherein said weakly-typed code module utilizes one or more weakly-typed variables. The first interface component operates to allow a user to pre-associate at least one of said weakly-typed variables with a strong type in said database component. This may be accomplished via a graphical user interface or any other programming interface now known or to be developed. The second interface component operates to receive a request for data from an external program wherein said request for data is of said strong type. The processing component may be configured to access said database component to determine which weakly-typed code module is associated with said strong type; execute said weakly-typed code module determined in the previous step to derive a value; and return said value to said external program.

In another embodiment, the invention comprises a system for assembling code modules which includes a database component, a first interface component, a second interface component, and a processing component. The database component operates to pre-store a pointer to at least one weakly-typed code module wherein said weakly-typed code module utilizes one or more weakly-typed variables. The first interface component operates to allow a user to pre-associate at least one of said weakly-typed variables with a strong type and to pre-store the association in said database component. The second interface component operates to receive a request for data from an external program wherein said request for data is of said strong type. The processing component may be configured to access said database component to determine a dependency path of said weakly-typed code modules to derive a value associated with said strong type; execute said dependency path determined in the previous step to derive said value; and return said value to said external program.

In another embodiment the first interface component may further allow a user to designate a range of dates during which said weakly-typed code module may be executed.

In another embodiment the system may include a cache component wherein said value is stored in said cache component. The cache component may be checked by said processing component, prior to accessing said database component, to determine if said value is stored thereon and, if said value is present in said cache component, to return said value to said external program.

In another embodiment, the dependency path of said code modules may be constructed by matching said input and output variables of the various code modules by their strong attribute types.

There may also be software embodiments of the invention.

In such an embodiment, a computer readable medium may have computer executable instructions for pre-registering at least one code module wherein said code module comprises at least one weakly-typed variable and pre-associating at least one of said weakly-typed variables with a strong type. The software may be programmed to accept a request for a value for a variable of said strong type from an external program; determine which of said pre-registered code modules will return a value for said requested strongly-typed variable; execute said code module determined in the previous step; and return said value to said external program.

In another embodiment, the software may also be programmed to assemble a dependency path of said code modules to derive said value. The dependency path of said code modules may be constructed by matching said variables by their strong types.

Additional steps/components/operations may occur throughout the embodiments disclosed above without impacting the sequence/construction/programming described and/or claimed herein.

BRIEF DESCRIPTION OF THE DRAWINGS

FIG. 1 shows the Attribute Types that may be registered with each of the above example DEX.

FIG. 4 illustrates a table and a schema to define various DEX to support the calculation of a telephony tariff.

FIGS. 5-6 illustrate a table displaying the definition of various Data Enhancements to the generic DEX which supports the calculation of a telephony tariff.

FIGS. 8-9 are a time-sensitive version of FIGS. 6-7.

FIG. 11 demonstrates the ability of the caching infrastructure to categorize its data.

DETAILED DESCRIPTION OF THE INVENTION

To support a given vertical market application a number of vertical market code modules may be developed. Such code modules are called 'Data Extensions' or 'DEX'. Non-limiting examples of DEX may include:

"Cell Site Lookup" which may look up a map grid reference of a cellular phone base station.

"Distance Measurement" which may calculate the distance between two map references.

"Distance Zoning" which may return a zone code based on a number of different distance ranges.

More specific Data Enhancements within the same DEX may share the same Attribute Set but (may) use and return different Attributes (i.e., Data Enhancements within the DEX Cell Site Lookup may include the following enhanced code modules: Calling Site Lookup and Called Site Lookup). It should be noted that, although the examples are related to the telecom-industry for consistency and ease of understanding, there is no limit to what industry might be supported through the FEF.

When the DEX are registered within FEF, additional type information may be registered and saved (typically using relational database, or object/XML storage technologies) to provide strong type information ('Attribute Types') about each DEX (thus creating a Data Enhancement). Registering DEX to the FEF with strong Attribute Types allows a host system using those same Attribute Types to interface with the FEF. This minimizes invalid linkages from the extension code (DEX) to the host system. Thus, a plug-in may be loaded at run time.

Referring to FIG. 1, the table provides a sampling of three DEX (Cell Site Lookup, Distance Measurement, and Distance Zoning). The table further delineates the inputs and outputs for each DEX, their basic data types and the "strong" attribute type associated with the DEX by pre-registering it in the FEF.

Figure 2A:
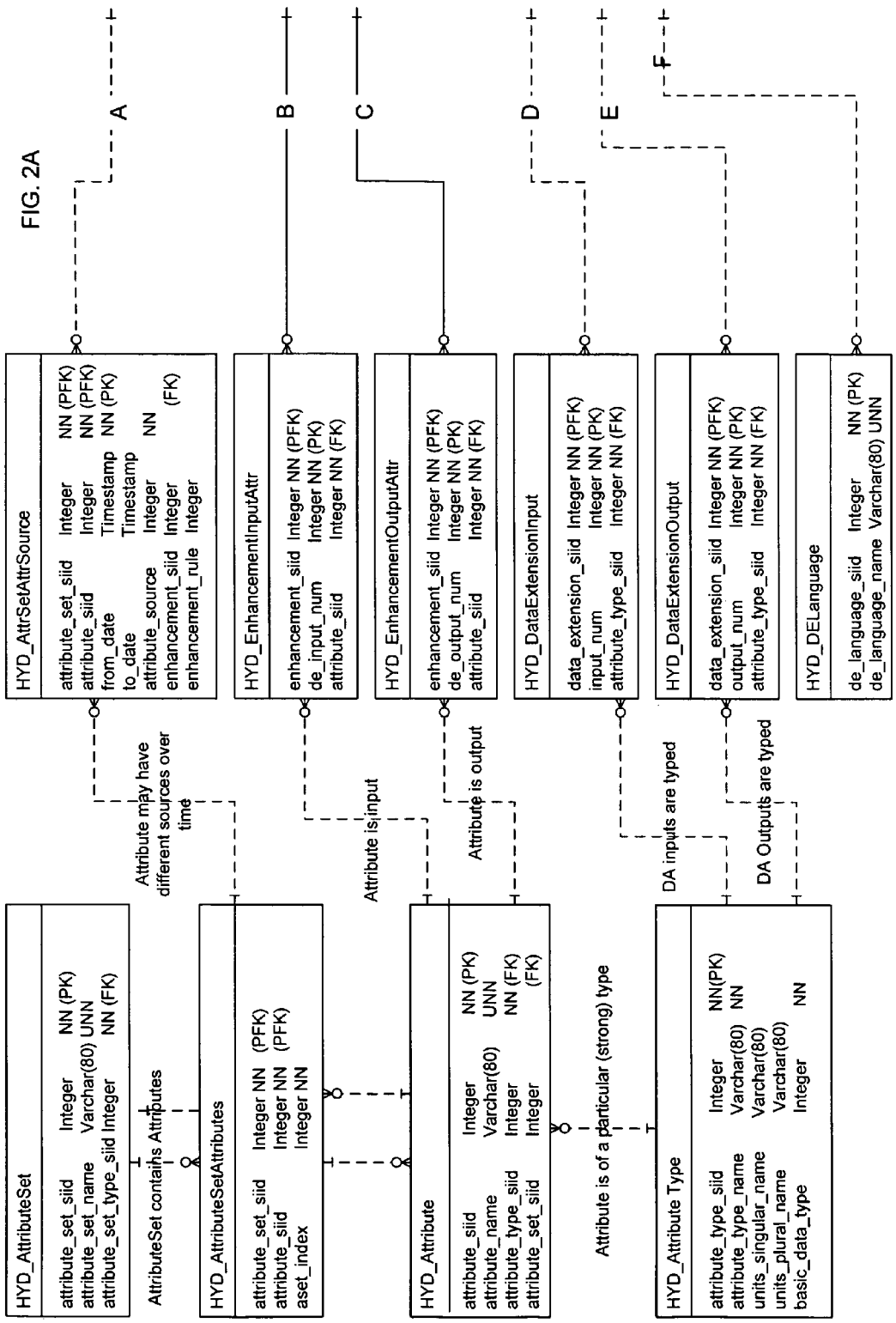
FIGS. 2A-2B, a schema, shows how the Attribute Types may be represented in a conventional relational database which represents the registration table of the FEF.
Figure 2B:
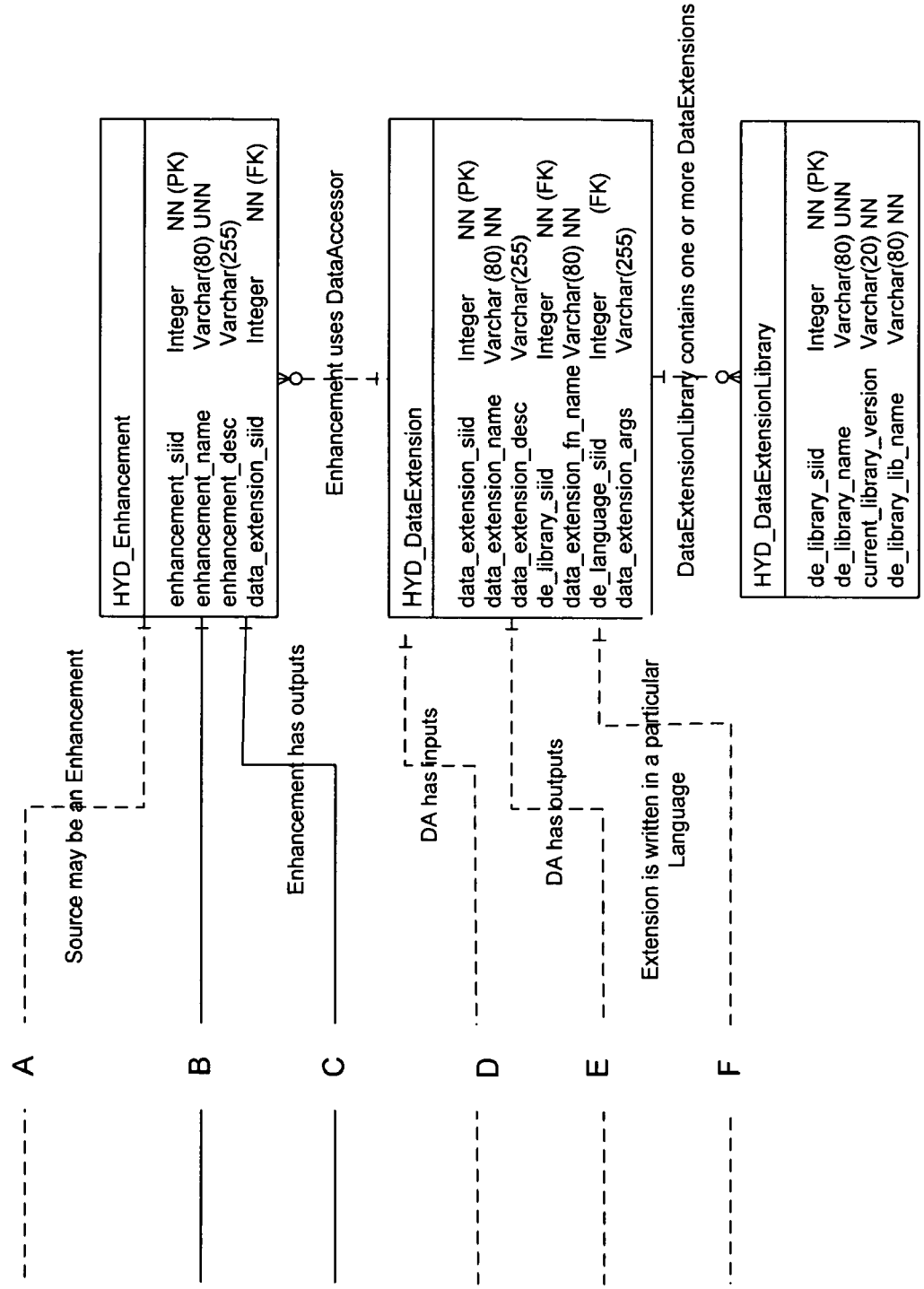

Referring to FIGS. 2A-2B, a schema shows how the information from the table in FIG. 1 may be represented in a conventional relational database which represents the registration table of the FEF. A number of attribute types (HYD_AttributeType) may be defined, based on 'Basic Data Types', with associated type name (Attribute Type) and labels for unit display. For instance, an attribute type of 'CellName' or 'LatLong' may be registered.

Each 'HYD_DataExtension' represents an external code module registered within the FEF. A number of DEX, which are packaged within one library, may be referred to as a 'HYD_DataExtensionLibrary'.

Associated with each DEX there may be a 'HYD_DEXLanguage' record that allows the FEF to invoke the correct binary or script execution environment. Different DEX could therefore be written in binary, Perl, Python, TCL etc.

The types of inputs and outputs may be defined for each DEX in 'HYD_DataExtensionInput' and 'HYD_DataExtensionOutput'.

The registration information may be used to assemble the DEX/Data Enhancement into a particular dependency path during the design phase or during runtime. The assembly process may check that the DEX uses both the correct basic data types for their input and output sets and the correct Attribute Types.

At design time, the Attribute Types may be used by an interface to ensure that compatible Data Enhancements are assembled into a dependency path.

The FEF may implement the processing as a number of stateless functions, with no provision for one function to directly call another (for example the FEF environment may not have a conventional stack that can be used for parameter passing and return address saving). At runtime, the processing (and processing order) of the Data Enhancements may be demand driven by the required data output values.

The FEF environment may recognize and optimize intermediate values of calculations that may be reused by a number of processing modules. It may also make these intermediate values available to construct audit trails. Thus, the result of each Data Enhancement may be calculated once but used one or more times for various modules.

Figure 3:
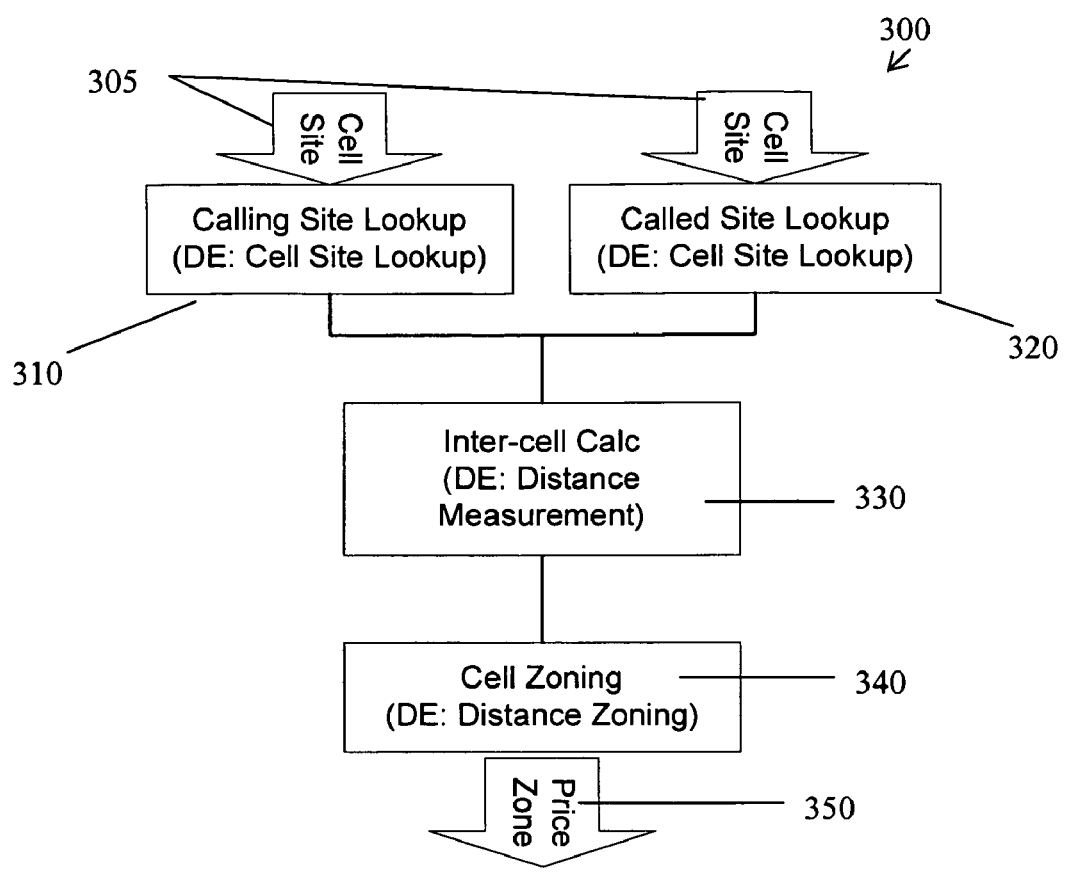
FIG. 3 illustrates an example flow of a calculation to support a simplified, for purposes of explanation, telephony tariff based on call distance.

Referring to FIG. 3, an example of a calculation to support a simplified (imaginary) telephony tariff based on call distance is illustrated. This example uses a DEX, described earlier, which calculates the distance in miles for the call, based on the call start and end locations, and uses this value to determine the resultant zoning code (effectively determining if the call is local or long distance).

In a conventional processing system this would normally be reduced to a procedural solution. For example the 'Cell Zoning' code (340) could call the 'Inter-cell Calculation' code (330) that in turn could call the 'Cell Site Lookup' code (310, 320) twice to lookup the geographical location of the calling and called sites (305).

To implement this within the FEF, a number of DEX instances may be defined to reflect each possible usage of the DEX. Referring to FIG. 4, the tables shown represent a simplified version of the DEX for supporting a tariff calculation. FIG. 5 illustrates that a Data Enhancement may be coded to be date-sensitive so that after a certain date, a different version of the Data Enhancement may be called by the FEF.

Referring to FIG. 6, a set of data (an 'Attribute Set) may be defined that specifies all the values within one grouping of data that is to be processed (in this example, "Zone Based Pricing"). The set includes information if the value is present (typically in memory) when the FEF is invoked for that set or if it must be derived using a specific DEX instance (Data Enhancement).

Information in this table can then be validated against the DEX definition to ensure that all of the Data Enhancements use Attributes with compatible 'Basic Data Types' and 'Attribute Types'.

Figure 7:
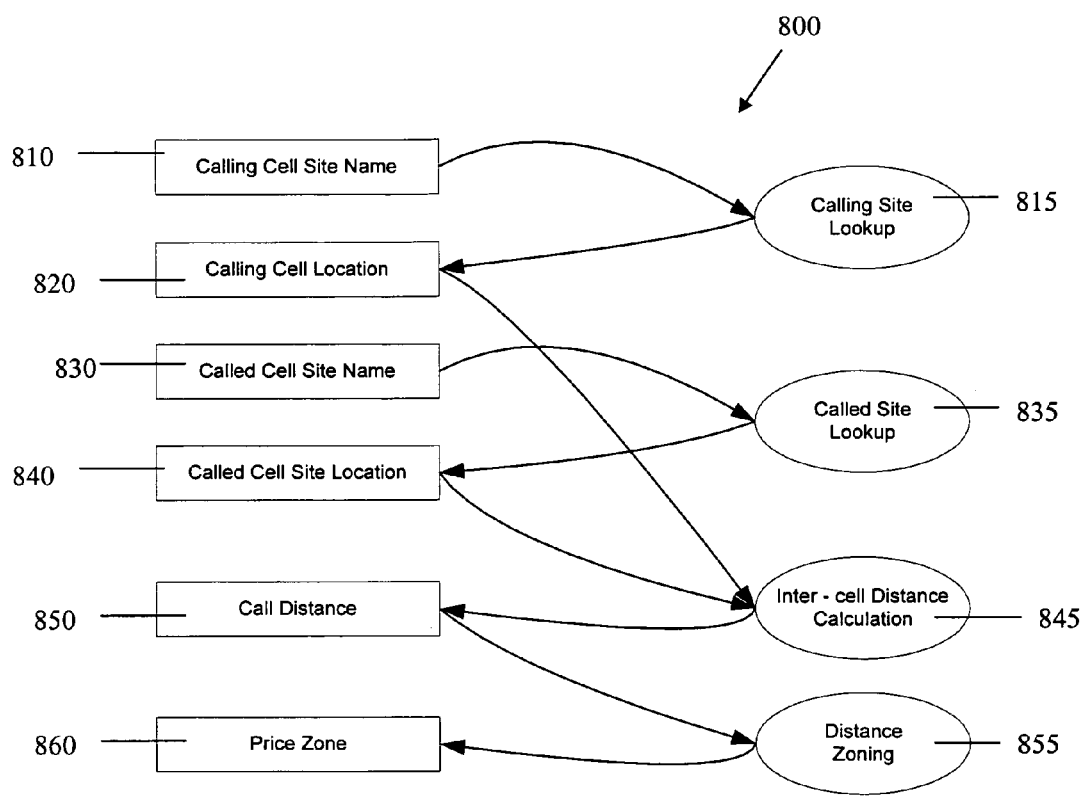
FIG. 7 illustrates a dependency graph for the data in the Attribute Set of the Data Enhancements depicted in FIG. 6.

Referring to FIG. 7, the information in the table can then be used to build a dependency graph (800) for the data in the Attribute Set, using the Data Enhancement information. The boxes represent the Attributes or strongly-typed variables (810, 820, 830, 840, 850, and 860). The 'circles' represent the Data Enhancements (815, 835, 845, 855). In this example, the cost of a call from a calling cell site to the called cell site needs to be calculated. To get the price zone (860), the Data Enhancement "Distance Zoning" (855) may be called but it cannot calculate the required value without further inputs than merely the "Calling Cell Site Name" (810) and the "Called Cell Site Name" (830). Distance Zoning (855) requires the distance between the calling site and the called site as input. To obtain this input, another Data Enhancement, "Inter-cell Distance Calculation" (845) may be called. This Data Enhancement requires as input the "Calling Cell Location" (820) and the "Called Cell Site Location" (840). These locations may be determined by calling the respective Data Enhancements "Calling Site Lookup" (815) and "Called Site Lookup" (835). Incidentally, each of these Data Enhancements may be based on the same generic code module but simply registered with the applicable strong types in the FEF to create the specific module used.

To process a specific Attribute Set, the Attribute Set is first created in the FEF environment. Those values that are identified as input are loaded into the Attribute Set (in this example the Calling Cell Site Name, and the Called Cell Site. Name). The FEF is invoked and external code can request any of the Attribute values. An external program may issue a request to the FEF through an application programming interface (API) or via a library linked to the external program. Values marked as input are returned directly. Values derived from DEX are checked, in the associated cache, to see if they have been previously accessed. If the value is not present, then the dependency graph (800) is traversed, and all of the dependent DEX are called in order using the associated Data Enhancement data to marshal the input and output values. For example, in FIG. 7, the site lookup functions (815, 835) would be called first as being at the 'far end' of the dependency tree (800).

Attribute values may be cached. So, for example, if the first Attribute requested is the 'Price Zone' (860) then all of the Data Enhancements would be called, starting with the Data Enhancements to undertake site lookup (though the data does not dictate if the 'Called' or 'Calling' lookup is evaluated first). However if the 'Call Distance' (850) has been previously requested, a request for 'Price Zone' (860) will only invoke the 'Distance Zoning' (855) Data Enhancement.

As outlined earlier each Data Enhancement individually runs to completion; there is no direct mechanism for one Data Enhancement to call another Data Enhancement, and each Data Enhancement may not have knowledge of the dependent Data Enhancements. This provides for a robust execution environment which minimizes the problems associated with stack tracing and dumping on failure, recursion, and undetected loops in infinite recursion and/or stack overflow between Data Enhancements.

Figure 9:
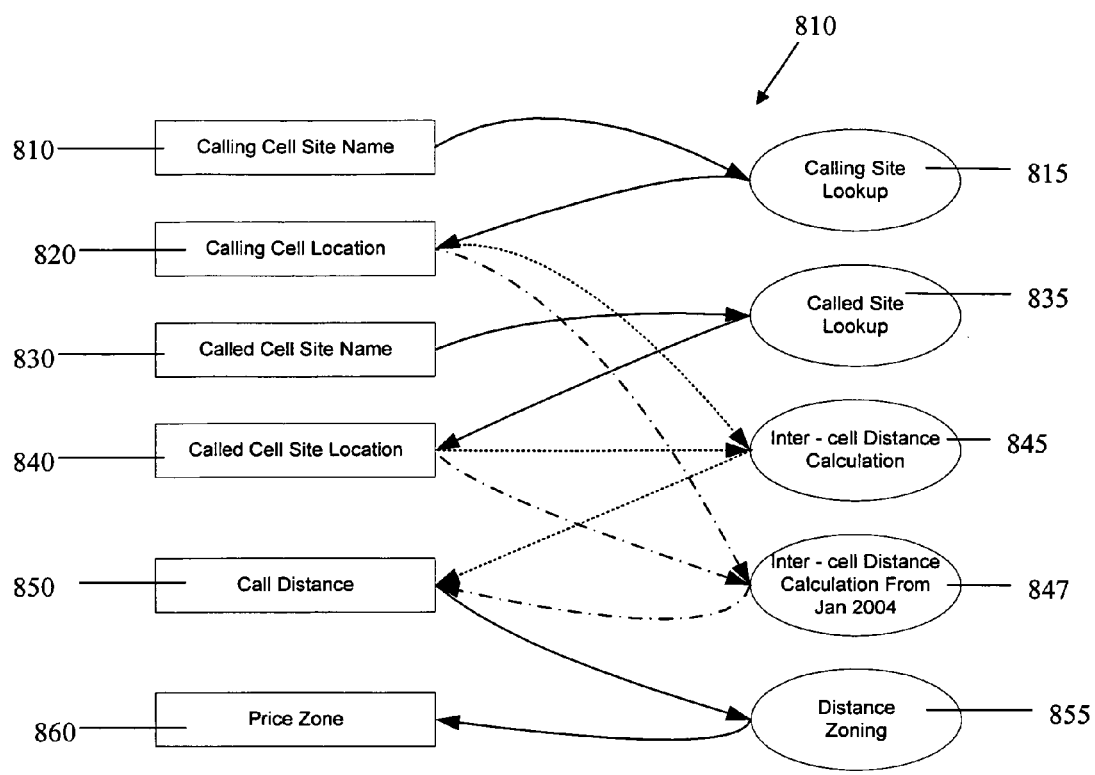

Referring to FIGS. 5 and 8-9, the HYD_AttributeSetAttributes table allows the processing to be varied based on the date for which the request is being processed. For example, if a new 'Call Distance' (850) algorithm/code/module has to be introduced from a given date (e.g. to meet a regulatory change as to how the distance is calculated) then the table could be extended with a variety of date ranges. This will result in a revised dependency graph, and different Data Enhancements being invoked dependent on the date used in conjunction with the Attribute Set.

Other features, besides date sensitivity, that are associated with the context of the data, may be employed to vary dependency paths (e.g., execution environments, preferred customer discounts, geographic modules, etc.).

DEX may also have access to reference data (e.g. read only data such as cell site location lookup tables) or specific customer data (e.g. customers location, address, birthday etc).

The FEF includes a data caching infrastructure, so that DEX may make use of data which is external to the standard event-processing application, and not provided as part of any attribute set. The cache infrastructure provides the DEX with a means (e.g., an application programming interface) to access any required data via in-memory, read-only access techniques, to minimize the latency and cost of data access. Thus, the DEX can make use of additional data types without the overhead of conventional data access techniques (i.e. relational database query, file I/O, etc.). The cache infrastructure may be a framework comprising fixed processes which work with abstract plug-in classes to facilitate the retrieval and caching of the operator-defined data types. The operator is free to declare and implement any number of custom data types for use with this framework. The cache infrastructure may comprise the following components: data fetchers, serializable data types, key translation, and processes for acquiring and loading the data into memory.

Data fetchers are plug-in classes derived from a common abstraction. The data fetchers, as defined by the operator at run-time, may be loaded as a plug-in module at run-time. Thus new data fetchers may be added to a running system at any time. The data fetchers provide the logic to extract a specific type of data from an external system or database. The fetcher may be a configurable generic code module (e.g. to access an Oracle database, SAP system, or to invoke a web service), or a dedicated code module to extract data from a custom system. The data fetcher may be invoked by the standard extract processes of the host system so that the DEX are able to ensure that the necessary data is extracted into the caches.

The Serializable Data Type is an abstract class defining the methods which a cacheable data type must support. The operator is free to derive any number of data types—each representing a particular data type which is to be stored in the in-memory caches of the FEF. Such classes represent the external data type that is being cached by the FEF (ex. Customer, Cell Site, etc.). There are no restrictions on the amount or complexity of such classes. The data class provides for the composition, validation, optional compaction and serialization of the fetched data into a binary block ('blob') that can be passed between processes and stored in the memory caching infrastructure. The data object may be an object type generated directly from an external database schema, XML schema/WSDL, or may be a dedicated representation of data from a custom system.

Figure 10:
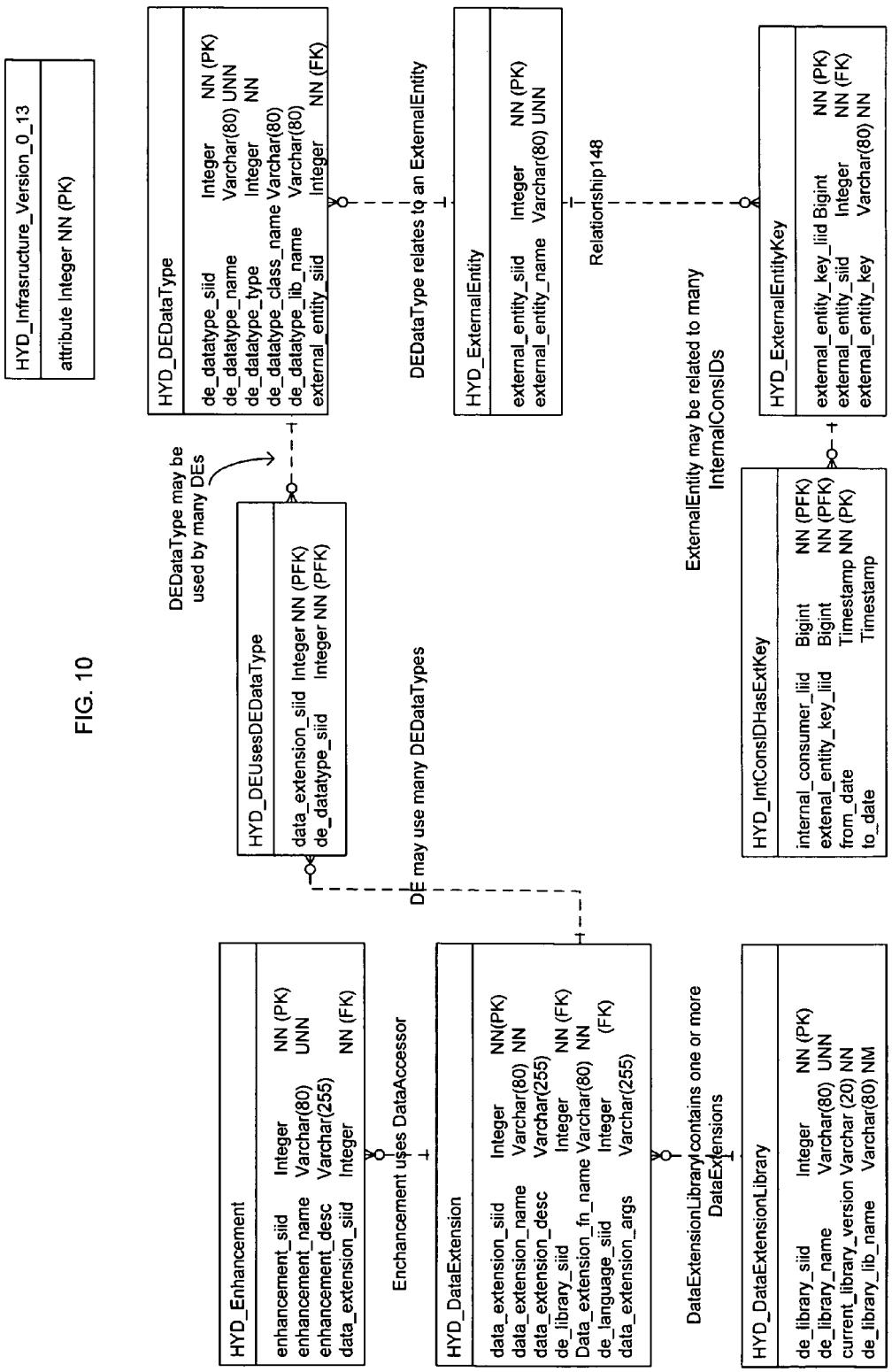
FIG. 10 represents one possible schema for the caching infrastructure.

Key translation may comprise a long key (e.g. customer reference number) by which to reference external data. This may be inefficient to cache (in terms of memory use) and may be slow to access when compared with a simple, internally allocated 32-bit or 64-bit integer reference number. The key translation and allocation support allows all of the internal accesses to be tied to the internally allocated ID. This service may be, normally, used for customer or other non-global data (e.g., using the Hydra 'InternalConsumerId'). Global reference data can use an external key if required as such data is normally only read once at start-up and only one key is use to reference each block of reference data as opposed to millions of customer keys Referring to FIG. 10, the cache infrastructure may include the following schema elements: HYD_DEDataType and HYD_DEUsesDEDataType The 'HYD_DEDataType' table defines each type of cached data that may be accessed by a Data Extension. Associated with each 'HYD_DEDataType' are details of the location of the data fetcher ('de_datatypetype' & 'de_datatype_class_name').

The 'HYD_DEUsesDEDataType' table defines the 'HYD_DEDataType' that may be used by each of the DEX. A number of DEX may use the same 'HYD_DEDataType', and a DEX may use a number of different 'HYD_DEDataType'. This table insures that the cache data required by the DEX may be available by loading it into memory.

Every cached item may have an external key 'HYD_ExternalEntityKey'. This may be related to a number of internal keys ('HYD_IntConsidHasExtKey'). Note that the 'HYD_IntConsidHasExtKey' has a date range so that the internal key may be associated with a number of external keys over time.

Referring to FIG. 11, in order to meet the isolation or data consistency requirements of the plug-in data extensions, the caching infrastructure may categorize the external data into one of three categories: partitionable, global, reference data.

Partitionable data refers to external data which has a clear relationship to specific instances of data in the core system (e.g., the data is related to specific consumers). The core data type provides the basis for the partitioning of work across multiple machines (i.e., each consumer may be assigned to a particular machine which handles the rating of that consumer's events). Because of this association, the external data can likewise be partitioned so that it is only loaded into the memory of those machines where it is needed. The caching subsystem also provides for the replication of changes to the external data into the running system continuously.

Global data cannot be clearly partitioned, either because its associations to core entities do not reflect the way in which work is partitioned, or because there are no clear associations. Such data is loaded into the memory cache of all processing machines, so as to be available globally. As with partitionable data, the caching subsystem also provides for the replication of changes to the external data into the running system continuously.

Reference data also cannot be clearly partitioned and is required on every processing node. However, unlike global data, the caching subsystem does not continually replicate changes to reference data into the memory caches. Rather, a mechanism is provided to take a single, point-in-time extract of all reference data types in order to produce a new reference data set. This mechanism provides support for data which may have complex relationships, and insures that the plug-in DEX are not exposed to data inconsistencies which might otherwise result from a continuous replication strategy.

The caching infrastructure comprises a number of processes which may use the fetcher and serializable data type classes previously described to acquire and load the cached data into memory. These processes are the extractor, change replicator, bulk loader, and refresh agent.

The extractor may use the operator-created fetcher classes to acquire data (serializable data objects) for a particular cache. The serialized form of these objects may be written to files which are suitable for loading into the in-memory caches on the various processing nodes. The extractors load fetcher classes at run-time based on the definitions given in the HYD_DEDataType table, using plug-in techniques. This process may be used to create new versions of reference data as needed.

The change replicators effect changes to the data being cached. The change replicator responds to such signals sent to the FEF by invoking the fetcher classes to re-acquire the particular data objects which have been modified. This may be performed continually for partitioned and global data in order to get all changes into memory as quickly as possible after the change occurs. As with the extractor, the change replicator may load fetchers at run-time, and as needed, based on the signaled changes.

The bulk loaders insure that data, required by the DEX, is loaded into memory. It provides start-up loading of all data needed by particular DEX into the in-memory caches which the DEX will use. The bulk loaders also continue to bring all changes posted by the change replicator into memory as they occur. The loader also handles work partitioning changes for those data caches which are so partitioned, and can likewise unload and load other caches as different DEX are themselves unloaded and loaded into the FEF.

The refresh agent is a process which can perform on-demand loading of particular data object (identified by key) into the in-memory region in the event that the DEX is unable to find expected objects when it is run.

Many other embodiments are possible using the principles illustrated herein and the examples presented herein should not be considered limiting in any fashion.

The invention claimed is:

1. A computerized method for assembling code modules comprising:
   pre-registering one or more weakly-typed code modules, wherein each module from said one or more weakly-typed code modules comprises one or more weakly-typed variables, in a computer-readable storage;
   pre-creating one or more enhanced code modules by performing, for each enhanced code module, one or more steps comprising storing an association between the enhanced code module and a set of data comprising:
      i) a weakly-typed variable from a weakly typed code module from the one or more weakly typed code modules, and
      ii) a strong attribute type,
   in the computer-readable storage, such that the pre-creation of the one or more enhanced code modules results in the computer-readable storage containing a list comprising each of said one or more enhanced code modules and the associated strong attribute types;
   accepting a request for a value for a variable of a requested strong attribute type from an external program at runtime;
   retrieving said list from said computer readable storage;
   using said list, determining which enhanced code module is associated with said strong attribute type of said requested variable;
   executing said enhanced code module to determine said value for said variable of said strong attribute type; and
   returning said value to said external program.

2. A computerized method for assembling code modules, as claimed in claim 1, wherein pre-creating one or more enhanced code modules comprises:
   a) storing an association between a first enhanced code module and:
      i) a first weakly typed variable from a first weakly typed code module; and
      ii) a first strong attribute type;
   b) storing an association between a second enhanced code module and:
      i) the first weakly typed variable from the first weakly typed code module; and
      ii) a second strong attribute type.

3. A computerized method for assembling code modules, as claimed in claim 1, wherein said pre-creating step includes setting a record in said enhanced code module indicative of a particular execution environment.

4. A computerized method, as claimed in claim 1, wherein said pre-creating step includes setting a record in at least one enhanced code module indicative of a range of dates during which said at least one enhanced code module may be executed.

5. A computerized method for assembling code modules comprising:
   pre-registering a plurality of weakly-typed code modules, wherein said weakly-typed code modules comprise one or more weakly-typed variables, in a computer-readable storage;
   pre-creating at least one enhanced code module by associating at least one of said weakly-typed variables with at least one strong attribute type;

accepting a request for a value for a variable of said strong attribute type from an external program at runtime;

accessing a computer-readable storage comprising a list of said strong attribute types and their associated enhanced code modules;

determining a dependency path of said enhanced code modules to derive said requested value;

executing the enhanced code modules in said dependency path to determine said value; and returning said value to said external program.

6. A computerized method for assembling code modules as claimed in claim 5, wherein said value is stored in a cache.

7. A computerized method for assembling code modules as claimed in claim 6, wherein said cache is checked after said "accepting a request for a value" step and, if said value is present in said cache, returning said value to said external program.

8. A computerized method, as claimed in claim 5, wherein said pre-creating step further includes setting a record in said enhanced code module indicative of a range of valid dates during which said enhanced code module may be executed.

9. A computerized method, as claimed in claim 5, wherein said dependency path of said enhanced code modules is automatically constructed by matching a set of inputs and outputs for said enhanced code modules by their strong attribute types.

10. A computerized method for assembling one or more code modules to calculate a rate associated with a phone call comprising:

pre-programming a generic code module configured to return a derived value based on a difference between a first and second value;

pre-registering said generic code module in a computer-readable storage;

pre-creating an enhanced code module to be associated with said generic code module by associating a strong attribute type with said derived value wherein said strong attribute type is of type zone;

accepting a request for a value of type zone from an external program;

determining which enhanced code module returns a value of type zone;

executing said enhanced code module; and returning said value of type zone to said external program.

11. A computerized method for assembling code modules comprising:

pre-registering a data extension module comprising one or more weakly-typed variables in a computer-readable storage;

pre-creating a data enhancement module by performing one or more steps comprising storing an association between a weakly-typed variable from said one or more weakly-typed variables and a strong attribute type in the computer-readable storage, such that said pre-creation results in the computer-readable storage containing a list comprising the data enhancement module and an association with the strong attribute type as output of the data enhancement module;

accepting a request for a value of said strong attribute type from an external program at runtime;

retrieving the list from said computer readable storage;

based on the association between the strong attribute type and the data enhancement module in the list, identifying the data enhancement module for execution;

executing said data enhancement module; and returning said value to said external program.

12. A computer readable medium having computer executable instructions for performing a method comprising:

pre-registering at least one code module wherein said code module comprises at least one weakly-typed variable;

pre-associating at least one of said weakly-typed variables with a strong type;

accepting a request for a value for a variable of said strong type from an external program;

determining which of said pre-registered code modules will return a value for said requested strongly-typed variable;

executing said code module determined in the previous step; and returning said value to said external program.

13. A computer readable medium having computer executable instructions for performing a method as claimed in claim 12 wherein said determining step further comprises assembling a dependency path of said code modules to derive said value.

14. A computer readable medium having computer executable instructions for performing a method as claimed in claim 13 wherein said dependency path of said code modules is automatically constructed by matching said variables by their strong types.

15. A computerized method for assembling code modules comprising:

pre-registering a plurality of weakly-typed code modules, wherein each weakly-typed code module from said plurality of weakly-typed code modules comprises one or more weakly-typed variables, in a computer-readable storage;

pre-creating a plurality of enhanced code modules by performing, for each enhanced code module, one or more steps comprising storing an association between the enhanced code module and a set of data comprising:

i) a weakly-typed variable from a weakly-typed code module, and ii) a strong attribute type, such that the pre-creation of the plurality of enhanced code modules results in the computer-readable storage containing a list comprising each of said plurality of enhanced code modules and the associated strong attribute types;

accepting a request for a value for a variable of a requested strong attribute type from an external program at runtime;

retrieving the list from the computer-readable storage;

using the list, determining which enhanced code module is associated with said requested strong attribute type;

executing said enhanced code module to determine said value for said variable of said requested strong attribute type and, if said enhanced code module requires a value for an additional variable of a different strong attribute type:

a) using the list, determining which additional enhanced code module is associated with said different strong attribute type;

b) executing said additional enhanced code module to determine said value for said additional variable of said different strong attribute type and, if said additional enhanced code module requires a value for another additional variable of a further strong attribute type, repeating steps (a)-(b);

c) returning said value for said additional variable to said enhanced code module;

returning said value for said variable of said requested strong attribute type to said external program.

* * * * *